US011250218B2

(12) United States Patent
Sarikaya et al.

(10) Patent No.: US 11,250,218 B2
(45) Date of Patent: Feb. 15, 2022

(54) PERSONALIZING NATURAL LANGUAGE UNDERSTANDING SYSTEMS

(71) Applicant: Microsoft Technology Licensing, LLC, Redmond, WA (US)

(72) Inventors: Ruhi Sarikaya, Redmond, WA (US); Xiaohu Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1145 days.

(21) Appl. No.: 14/966,031

(22) Filed: Dec. 11, 2015

(65) Prior Publication Data

US 2017/0169013 A1    Jun. 15, 2017

(51) Int. Cl.
*G06F 40/40* (2020.01)
*G06N 20/00* (2019.01)
(Continued)

(52) U.S. Cl.
CPC ............ *G06F 40/40* (2020.01); *G06F 16/243* (2019.01); *G06F 16/3329* (2019.01);
(Continued)

(58) Field of Classification Search
CPC .. G06F 17/28; G06F 16/3329; G06F 16/9535; G06F 16/243; G06F 16/3331; G06F 17/30657; G06F 17/2705; G06F 40/40; G06F 40/205; G06F 16/24573; G06F 16/9537; G06F 16/24575; G06F 16/3344; G06F 16/435; G06F 16/635; G06F 16/68; G06F 16/735; G06F 16/93; G06N 20/00; G06N 99/005; H04L 63/083
See application file for complete search history.

(56) References Cited

U.S. PATENT DOCUMENTS 5,857,188 A    1/1999  Douglas
6,332,038 B1 * 12/2001 Funayama ............. H04N 5/262
                                                           348/135
(Continued)

FOREIGN PATENT DOCUMENTS

CN    103870505 A    6/2014
CN    104699676 A    6/2015
CN    104850539 A    8/2015

OTHER PUBLICATIONS

PCT International Search Report and Written Opinion in International Application PCT/US2016/063802, dated Feb. 7, 2017, 16 pgs.

(Continued)

*Primary Examiner* — Pierre M Vital
*Assistant Examiner* — Andalib F Lodhi

(57) ABSTRACT

Examples of the present disclosure describe systems and methods of personalizing natural language systems. In aspects, personal data may be uploaded to a personalization server. Upon receiving a data request, a server device may query the personalization server using a user's login information. The login data and the associated personal data may be paired and provided to the personalization server. The paired data may then be provided to a language understanding model to generate a response to the data request. The data in the response may be used to train the language understanding model.

19 Claims, 11 Drawing Sheets

(51) Int. Cl.
*G06F 16/33* (2019.01)
*G06F 16/332* (2019.01)
*G06F 16/9535* (2019.01)
*G06F 16/242* (2019.01)
*G06F 40/205* (2020.01)
*H04L 29/06* (2006.01)

(52) U.S. Cl.
CPC ...... *G06F 16/3331* (2019.01); *G06F 16/9535* (2019.01); *G06F 40/205* (2020.01); *G06N 20/00* (2019.01); *H04L 63/083* (2013.01)

(56) References Cited

U.S. PATENT DOCUMENTS

| | | | |
|---|---|---|---|
| 7,933,766 B2 | 4/2011 | Gupta et al. | |
| 8,166,026 B1* | 4/2012 | Sadler | G06F 16/951 707/725 |
| 8,335,753 B2* | 12/2012 | Rappaport | G06N 5/022 706/45 |
| 8,798,990 B2 | 8/2014 | Bangalore et al. | |
| 9,082,402 B2 | 7/2015 | Yadgar | |
| 2003/0212544 A1 | 11/2003 | Acero | |
| 2004/0044516 A1* | 3/2004 | Kennewick | G10L 15/22 704/5 |
| 2004/0117189 A1* | 6/2004 | Bennett | G06F 17/27 704/270.1 |
| 2009/0282038 A1* | 11/2009 | Subotin | G06F 16/957 |
| 2010/0042404 A1 | 2/2010 | Gupta et al. | |
| 2012/0089581 A1* | 4/2012 | Gupta | G06Q 10/00 707/706 |
| 2012/0167234 A1* | 6/2012 | Donfried | G06F 21/31 726/29 |
| 2014/0059030 A1* | 2/2014 | Hakkani-Tur | G06F 17/2818 707/706 |
| 2014/0136183 A1 | 5/2014 | Herbert et al. | |
| 2014/0280757 A1 | 9/2014 | Tran | |
| 2014/0350933 A1* | 11/2014 | Bak | G10L 15/1822 704/249 |
| 2014/0379326 A1 | 12/2014 | Sarikaya et al. | |
| 2015/0032442 A1 | 1/2015 | Marcus | |
| 2015/0120199 A1* | 4/2015 | Casey | G01V 1/32 702/14 |
| 2016/0196563 A1* | 7/2016 | Srinivasan | G06F 16/951 705/7.29 |

OTHER PUBLICATIONS

Levit, M. et al., "Personalization of Word-Phrase-Entity Language Models", Sep. 6, 2015, retrieved from the Internet on Sep. 13, 2016 at: http://www.isca-speech.org/archive/interspeech_2015/papers/il5_0448.pdf, 5 pgs.
Liu, Xiaohu et al., "Personalized Natural Language Understanding", Interspeech 2016, vol. 2016, Sep. 12, 2016, pp. 1146-1150.
"International Preliminary Report on Patentability Issued in PCT Application No. PCT/US2016/063802", dated Feb. 7, 2018, 9 Pages.
"Second Written Opinion Issued in PCT Application No. PCT/US2016/063802", dated Oct. 18, 2017, 8 Pages.
Ali El-Kahky et al., "Extending Domain Coverage of Language Understanding Systems via Intent Transfer between Domains using Knowledge Graphs and Search Query Click Logs", In Proceedings of IEEE International Conference on Acoustic, Speech and Signal Processing, May 4, 2014, 5 pgs.
Yangyang Shi, et al., "Contextual Spoken Language Understanding Using Recurrent Neural Networks", In Proceedings of 40th IEEE International Conference on Acoustics, Speech and Signal Processing, Apr. 19, 2015, 5 pgs.
Charles Callaway et al., "Personal Reporting of a Museum Visit as an Entrypoint to Future Cultural Experience", In Proceedings of the International Conference on Intelligent User Interfaces, Jan. 9, 2005, 3 pgs.
Aditya Bhargava et al., "Easy Contextual Intent Prediction and Slot Detection", In Proceedings of IEEE International Conference on Acoustics, Speech, and Signal Processing, May 2013, 5 pgs.
Gokhan Tur, "Model Adaptation for Spoken Language Understanding", In Proceedings of IEEE International Conference on Acoustics, Speech, and Signal, Mar. 18, 2005, 4 pgs.
"Spoken Language Understanding", http://research.microsoft.com/en-us/projects/languageunderstanding/, published May 4, 2013, 7 pgs.
"Office Action Issued in European Patent Application No. 16809616.2", dated Mar. 26, 2021, 10 Pages.
"First Office Action and Search Report Issued in Chinese Patent Application No. 201680072630.7", dated Jun. 29, 2021, 16 Pages.

* cited by examiner

PERSONALIZING NATURAL LANGUAGE UNDERSTANDING SYSTEMS

BACKGROUND

Natural language understanding (NLU) is the ability of a computer program to understand human speech and to extract the meaning of spoken or typed input. NLU systems have been used in conjunction with a variety of domains (e.g., places, weather, communication, reminders). Typically, NLU systems treat individual users anonymously (e.g., the system behaves the same for all users). As a result, users are provided a degraded user experience in which user-specific behavior and actions are ignored during query processing.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of personalizing natural language systems. In aspects, personal data may be uploaded to a personalization server. Upon receiving a data request, a server device may query the personalization server using an identification data (e.g., a user's login information). The identification data and the associated personal data may be paired and provided to the personalization server. The paired data may then be provided to a language understanding model to generate a response to the data request. The data in the response may be used to further train the language understanding model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
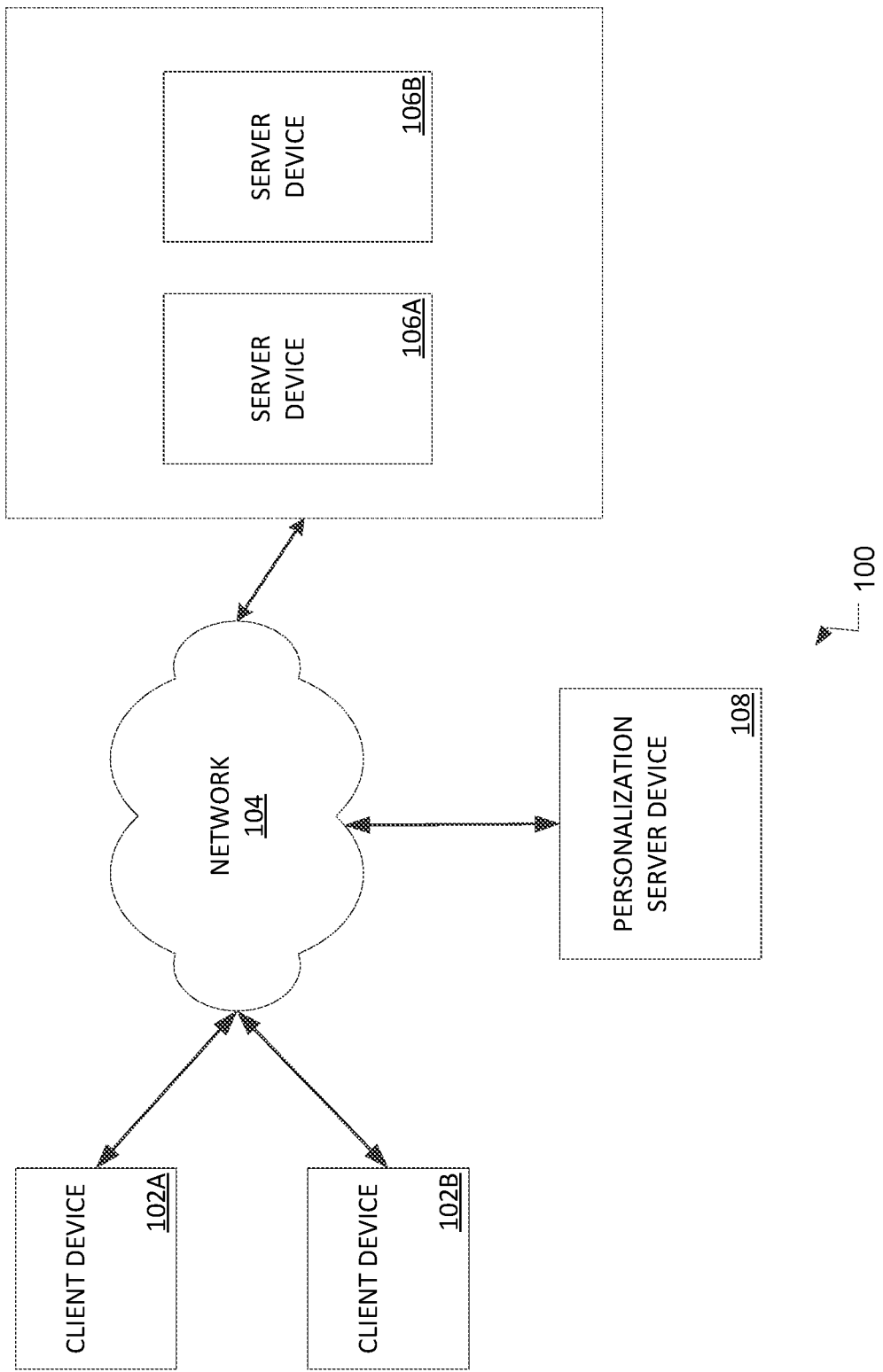
FIG. 1 illustrates an overview of an example system for implementing natural language personalization techniques as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of personalizing natural language systems. In examples, a client device may upload personal data to a personalization server. Personal data, as used herein, may refer to information in a user profile and/or user-specific signals. User signals (also referred to as signal data), as used herein, may refer to personal contacts, user files and documents, user locations, user applications, user social media information, user interests, user calendar information, user event data, user- and/or client-identifying information etc. A personalization server, as used herein, may refer to a device storing personal data for one or more users. One skilled in the art will recognize that any type of processing device may be utilized with examples of the present disclosure.

In some examples, after the personal data has been uploaded, the client device may send a data request to a natural language understanding (NLU) server. A data request, as used herein, may refer to a set of data comprising a query and/or identifying information for a user and/or the client device. One skilled in the art will recognize that examples of the present disclosure may be applied to any input understanding processing including input that is processed in a form such as voice/utterance, text, handwritten input, and touch, among other examples. An NLU server, as used herein, may refer to a device for extracting and/or processing semantic content from input in order to represent domain(s), intent(s) and/or slot(s) of the input. A domain, as used herein, may refer to a container and/or a boundary that isolates or defines an application, software functionality, or a set of data. For example, an "events" domain may be used to search and purchase event-related items; whereas a "places" domain may be used to search for places and directions to the places. An intent, as used herein, may refer to the goal or intention of user's utterance or other entered input. For example, a "show movies" intent may be assigned to the query "What new movies are playing?" A slot, as used herein, may refer to the actionable content within the user's utterance or other entered input. For example, the entity "The Avengers" may be assigned to the slot "movie_name" for the query "I want to see The Avengers tonight."

In aspects, the NLU server may process the received query and send at least a portion of the identifying information to the personalization server. The personalization server may match the identifying information to personal data associated with the user and provide the personal data to the NLU server. The NLU server may provide the personal data as input to one or more language understanding (LU) models. An LU model, as used herein, may refer to a statistical language model that may be used to determine a probability distribution over one or more word sequences. In examples, a model may be a rule-based model, a machine-learned regressor, a machine-learned classifier, or the like. The LU model(s) may output a result set for the data request and send the result set to the client device In some examples, result set data may be used to train or retrain the LU model(s). Training a model, as used herein, may refer to using a set of data to fit, for example, a statistical machine learned model that can be used to predict a response value from one or more predictors. Various techniques, such as word N-gram, dictionaries, personalization, etc., may be used to train or retrain a model. The trained (or retrained) LU model(s) may provide more accurate, personalized, and/or efficient result sets for the user. In other examples, training data may be used to train the LU model(s). Training data, as used herein, may refer to fake (e.g., dummy) user profiles with randomly generated personal information. Although LU models trained with training data may not be personalized to a user initially, the LU model(s) may be trained to expect and/or recognize features of input and to assign statistical weights and/or probabilities to the features and/or expected features.

Accordingly, the present disclosure provides a plurality of technical benefits including but not limited to: personalizing natural language models and systems; improving detection, intent detection, and slot tagging; improvements to resolving tagged entities (e.g., mapping a name used in a query to a unique ID in the contact list); improving runtime feature extraction; increasing query processing speed; reducing the amount of training data needed to train language understanding models; reducing the time and resource cost required to annotate a domain; increasing the quality and accuracy of query results (thereby, reducing the amount of "follow-up" queries), reducing the bandwidth and power consumption of the devices within the system and improving efficiency and quality for applications/services utilizing examples of the present disclosure, among other examples.

FIG. 1 illustrates an overview of an example system for implementing personalization techniques for natural language systems as described herein. Exemplary system 100 presented is a combination of interdependent components that interact to form an integrated whole for personalizing natural language systems. Components of the systems may be hardware components or software implemented on and/or executed by hardware components of the systems. In examples, system 100 may include any of hardware components (e.g., used to execute/run operating system (OS)), and software components (e.g., applications, application programming interfaces (APIs), modules, virtual machines, runtime libraries, etc.) running on hardware. In one example, an exemplary system 100 may provide an environment for software components to run, obey constraints set for operating, and makes use of resources or facilities of the system 100, where components may be software (e.g., application, program, module, etc.) running on one or more processing devices. For instance, software (e.g., applications, operational instructions, modules, etc.) may be run on a processing device such as a computer, mobile device (e.g., smartphone/phone, tablet) and/or any other electronic devices. As an example of a processing device operating environment, refer to the exemplary operating environments depicted in FIGS. 5-7. In other examples, the components of systems disclosed herein may be spread across multiple devices. For instance, input may be entered on a client device and information may be processed or accessed from other devices in a network such as one or more server devices.

As one example, the system 100 comprises client device 102A, client device 102B, client device 102C, distributed network 104, a distributed server environment comprising one or more servers such as server device 106A, server device 106B and server device 106C, and a personalization server device 108. One of skill in the art will appreciate that the scale of systems such as system 100 may vary and may include more or fewer components than those described in FIG. 1. In some examples, interfacing between components of the system 100 may occur remotely, for example where components of system 100 may be spread across one or more devices of a distributed network.

The client device 102A, for example, may be configured to receive user input signals (e.g., input from a user or information related to personal data of the user) via a user interface component or other input means. Examples of input may include voice, visual, touch and text input. Client device 102A may be further configured to transmit the input signals to a personalization server, such as personalization server device 108, via distributed network 104. In some examples, client device 102A may transmit the input signals to personalization server device 108 periodically or according to a defined schedule. Further, the input signals may be transmitted at a later time when one or more of client device 102A and personalization server device 108 is offline (e.g., not presently receiving queries from, for example, a user).

Client device 102B may be a different device type from client device 102A, but may be similarly configured to client device 102A. For example, a user may have a user account on client device 102A (e.g., a computer) and client device 102B (e.g., a mobile phone). Client device 102A may upload to personalization server device 108 user input signals related to browsed websites and accessed documents, and client device 102B may upload user input signals related to contact lists and GPS signals. In aspects, personalization server device 108 may be configured to receive, aggregate, encrypt and/or store the data from client device 102A and/or client device 102B according to an identification of the user (e.g., account ID, username, client ID, biometrics, etc.). For example, personalization server device 108 may segment and store data from a plurality of user devices in one or more tables of a relational database, such that the tables are related by an identification of the user. In a particular example, the stored data may be encrypted using any known encryption technique.

Client device 102A may be further configured to provide a query-generation interface, such as a digital personal assistant, a search engine webpage, and the like. The query-generation interface may be used to receive a data request from, for example, a user. In aspects, client device 102A may send the data for processing to a language understanding server, such as server device 106A. Server device 106A may be configured to receive and process a data request from a client device. In aspects, processing the data request may include parsing the data request to identify, for example, a query and/or identifying information associated with a user, and transmitting at least the personal data to personalization server device 108. Personalization server device 108 may be further configured to receive the identifying information and to authenticate a user with the identifying information. In aspects, after authenticating the user, personalization server device 108 may use the identifying information to identify whether a user associated with the identifying information has stored personal data on personalization server device 108. If stored personal data for the user is identified, personalization server device 108 may allow access to the corresponding the personal data or transmit a data structure comprising at least a portion of the personal data to server device 106A. In alternate aspects, after parsing the personal data, the personal data may be transmitted to a client device, such as client devices 102A and 102B, instead of, or in addition to, the personalization server device 108. In such aspects, the client device may be further configured to identify and allow server device 106A access to personal data stored on the client device.

Server device 106A may be further configured to process personal data from personalization server device 108. For example, server device 106A may include, or have access to, one or more language understanding (LU) models. In aspects, server device 106A may receive and decrypt the personal data and/or data request within the data structure, and provide at least a portion of this data as input to the LU model(s). The LU model(s) may use the input to, for example, identify features for one or more domains, intents and/or slots associated with the data request. The identified features may then be designated (e.g., tagged) for a corresponding domains, intents and/or slots. In some aspects, the LU model(s) may use the input to determine and/or assign weights (e.g., scored probabilities) to one or more of the features; thereby training the LU model(s) for data requests in the same or related domains. In other aspects, the LU model(s) may additionally or alternatively use training data to determine and/or assign weights to features. In a particular example, the training data may be used when the LU model(s) have not been previously trained (e.g., during a new install of the model or where personal information was not previously applied to the model) or are being retrained (e.g., during a reinstall of the model). Based at least in part on the input, the LU model(s) may determine a provisional response to be used with the data request. In one example, a provisional response may take the form of a query comprising features that have been filled in using the input.

In some aspects, server device 106A may access personal data on one or more of the client devices 102A and 102B and/or personalization server device 108 in order to resolve (e.g., verify) whether one or more of the determined and/or tagged features in the provisional response exists within the personal data. In examples, this resolution may be performed using, for example, a lookup mechanism (e.g., a table lookup, hash lookup, etc.) or a more sophisticated machine-learned model. In examples, when the tagged features are found in the personal data, the provisional response may be finalized into a final response. In an example, a final response may take the form of a query comprising features that have been verified using personal data. Server device 106A may send the final response to a search component, such as a search engine, to generate a result set. The result set may be transmitted to the query-generation interface of client device 102A for presentation.

Figure 2:
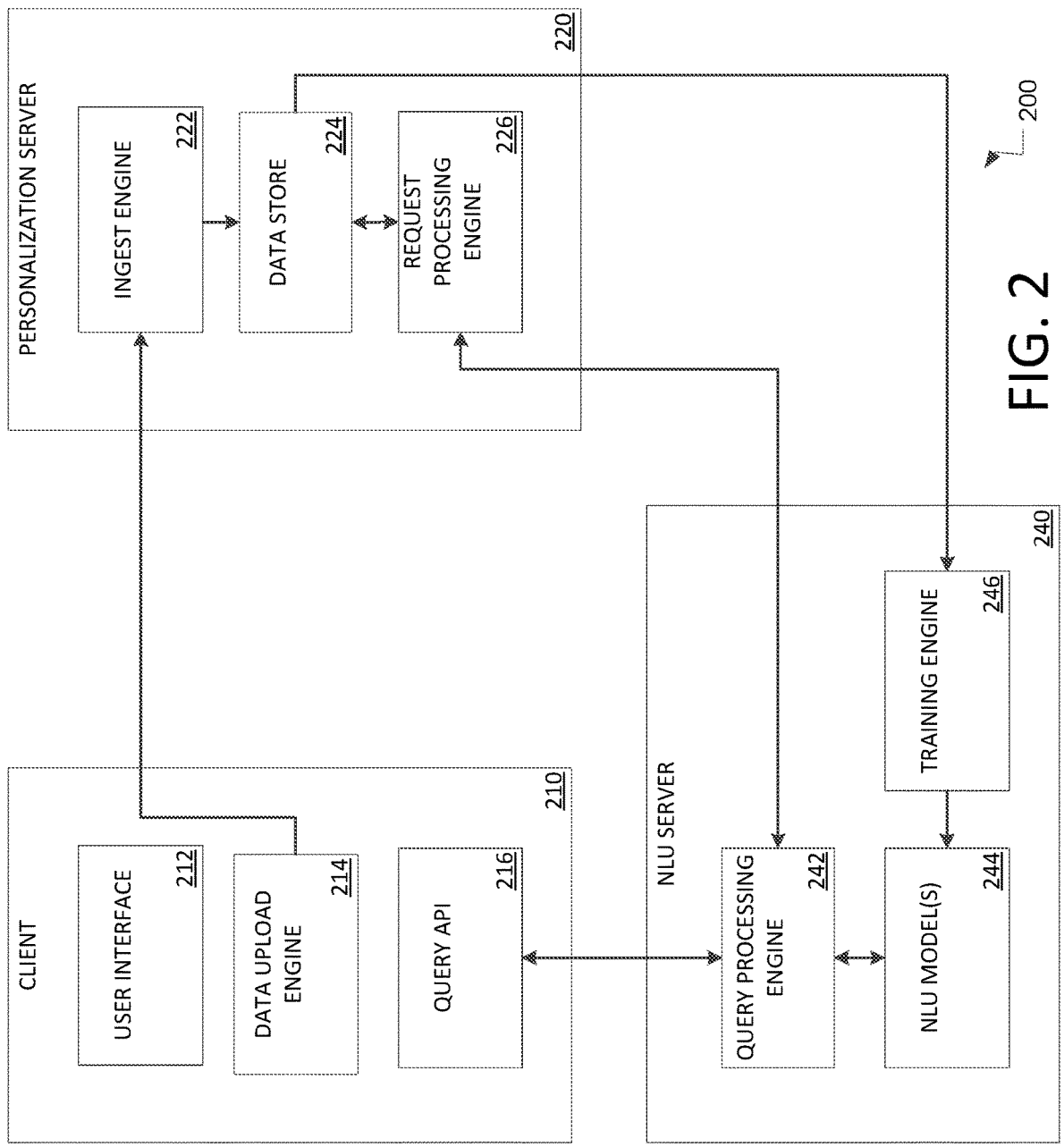
FIG. 2 illustrates an exemplary interplay between a client device, a personalization server, and a language understanding server as described herein.
Figure 3:
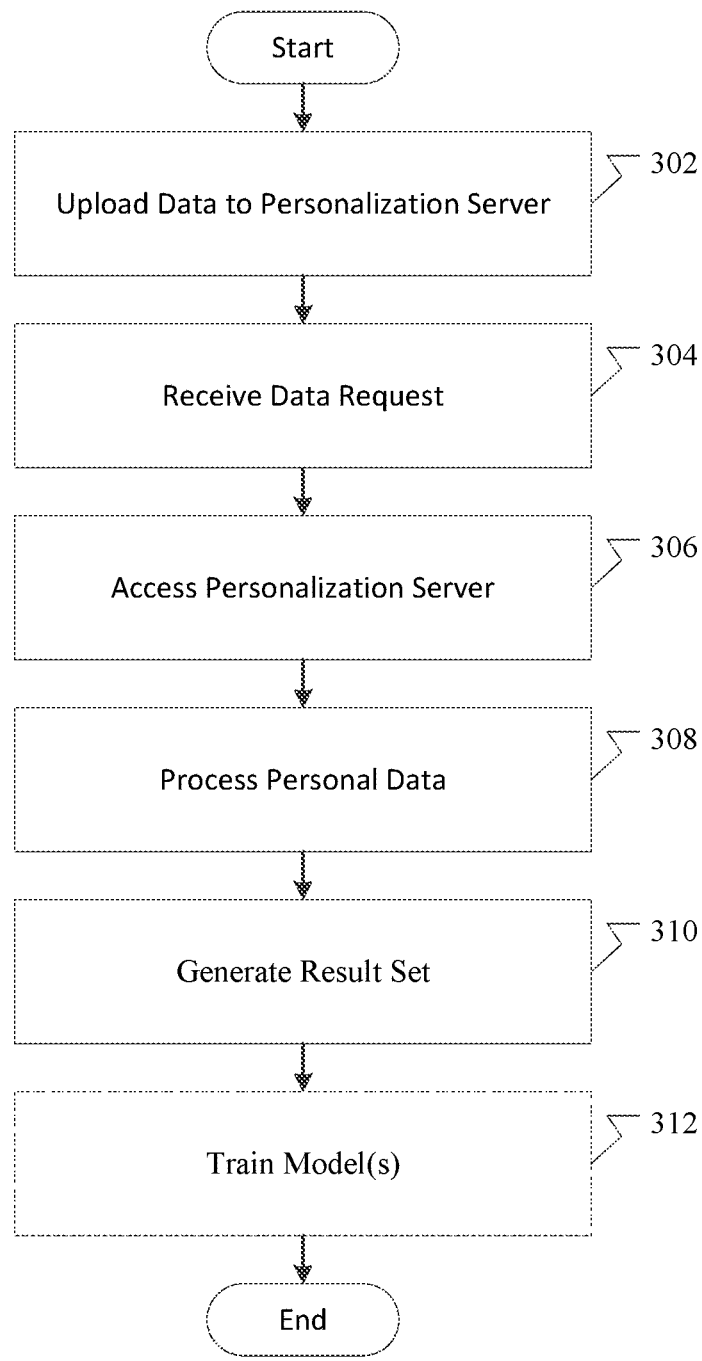
FIG. 3 illustrates an example method of personalizing a natural language understanding system as described herein.

FIG. 2 illustrates an overview of an exemplary interplay between a client device 210, a personalization server 220, and a language understanding server 240 as described herein. The natural language personalization techniques implemented by client device 210, personalization server 220, and/or language understanding server 240 may comprise the natural language personalization techniques and input described in FIG. 1. In alternative examples, a single system (comprising one or more components such as processor and/or memory) may perform processing described in systems 100 and 200, respectively. Further, client device 210, personalization server 220, and/or language understanding server 240 may comprise a user interface component as described in the description of FIG. 1.

Exemplary client device 210 may comprise user interface (UI) component 212, a data store, data upload engine 214, and query API 216, each having one or more additional components. The UI component 212 may be configured to receive signals from a client device. Signals, as used herein, may refer to user input (e.g., key presses, screen swipes, pauses, etc.), personal contacts, files and documents, location data, applications, application data, social media information, user interests and behavior data, user search data, calendar data, etc. In a particular example, UI component 212 may be configured to store received signals in a data store located on, or accessible by, client device 210. The data upload engine 214 may be configured to access the stored signals and transmit the stored signals to a personalization server, such as personalization server 220. In a particular example, data upload engine 214 may be operable to determine the last time an upload was performed and transmit only the data in the data store that has been added or modified after that time. In a separate example, data upload engine 214 may be operable to transmit all of the signals currently stored in the data store. In aspects, data upload engine 214 may upload the signals to a personalization server "offline" (e.g., when client device 210 is not actively communicating data to or from an LU server). For example, data upload engine 214 may automatically upload the signals according to a defined schedule or upon determining sufficient connectivity, or data upload engine 214 may only upload the signals according to a manual instruction.

The query API 216 may be configured to receive a data request. In aspects, the query may be received from a separate device or directly from a user. The data request may be associated with one or more domains and may comprise a query, a statement, a string of words, one or more labels, data associated with one or more intents and/or slots, and/or identifying information. An intent, as used herein, may refer to the goal or intention of an utterance or other entered input. A slot, as used herein, may refer to the actionable content within the utterance or other entered input. Identifying information, as used herein, may refer to information that identifies a user (e.g., user ID, account ID, username, etc.) and/or a client device (e.g., client ID, IP address, MAC address, etc.). The query API 216 may be further configured to transmit one or more portions of the data request to an LU server, such as NLU server 240. In one example, query API 216 may transmit a query and a user ID to the LU server.

Exemplary personalization server 220 may comprise ingest engine 222, a data store 224 and a request processing engine 226, each having one or more additional components. The ingest engine 222 may be configured to receive and/or process signals stored on, or accessible to, a client device, such as client device 210. For example, after receiving the signals, ingest engine 222 may configured to parse query data into one or more domains, intents and/or slots. Associations within the domains, intents and/or slots may be identified and/or established such that a plurality of slots may be associated with an intent, and a plurality of intents may be associated with a domain. The ingest engine 222 may encrypt the parsed data using any known encryption method and store the parsed data within a data store, such as data store 224. In examples, encrypting the data may preclude unauthorized users from viewing and/or accessing the data. In a particular example, the encryption may preclude a first user who is authorized to view the data of the first user from viewing the data of a second user. Data store 224 may be configured to store the parsed and/or encrypted data according to a user identification associated with the parsed data. For example, data store 224 may store the parsed data in one or more tables of a database according to a user ID in the parsed data.

The request processing engine 226 may be configured to receive and process a lookup request from a computing device, such as NLU server 240 and client device 210. In aspects, a lookup request may comprise at least a portion of a query, user-identifying information and/or client-identifying information. After receiving the lookup request, request processing engine 226 may attempt to authenticate the user identified by the identifying information. Authentication may be performed using any know authentication technique. When the user has been authenticated, request processing engine 226 may access data store 224. In some examples, request processing engine 226 may use the identifying information to identify corresponding personal data in the data store. In a particular example, a user ID may be used to identify a plurality of database rows comprising personal data corresponding to an identified user and/or domain. The identified personal data may be paired or otherwise associated with at least a portion of the identifying information. The request processing engine 226 may then transmit the paired information to the NLU server. In another example, a user ID and a slot value (for example, entity name) may be used to match personal data corresponding to the user ID and/or the slot value. The request processing engine 226 may then transmit a verification or similar acknowledgement to the NLU server.

Exemplary NLU server 240 may comprise query processing engine 242, NLU model(s) 244 and training engine 246, each having one or more additional components. The query processing engine 242 may be configured to receive and/or process data requests from a client device, such as client device 210. In aspects, query processing engine 242 may parse a data request into identifying information, one or more domains, intents and/or slots. Associations within the parsed data may be identified and/or established, as described above with respect to ingest engine 222. In some aspects, query processing engine 242 may comprise a ranking component. The ranking component may be a machine-learned classifier, a statistical ranking model, or the like. The ranking component may receive signal data and other information (e.g., personal data, user behavior data, application data, etc.) from one or more devices in systems 100 and 200. In a particular aspect, the ranking component may arbitrate between one or more LU models, such as NLU model(s) 244, and/or determine rankings for at least a portion of the parsed data. The rankings may determine, for example, the most accurate and/or most likely understanding for the data request (and, ultimately, the query), the most accurate resolution of domains, intents and/or slots, etc. In examples, portions of the parsed data may be transmitted to a personalization server, such as personalization server 220, to identify personal data corresponding to a user. In some aspects, NLU server 240 may receive personal data, identifying information, and/or a verification of identified personal data from the personalization server. The NLU server 240 may be further configured to parse the received personal data as discussed above. For example, query processing engine 242 may identify one or more domains, intents and/or slots in the received personal data.

The NLU model(s) 244 may be configured to receive data, such as personal data and/or training data, as input. In aspects, the NLU model(s) 244 may use the data as features for domain classification (e.g., places, weather, travel, movies, etc.) intent detection (e.g., find places, find directions, check weather, find movie time, etc.), and/or slot labeling (e.g., place name, application, user name, movie name, etc.). Using the input, NLU model(s) 244 may output, for example, a provisional query that is personalized to the user identified by the identifying information. In some examples, NLU server 240 may attempt to determine (e.g., resolve) whether the tagged features of the provisional query exist in the personal data. In such examples, this determination (e.g., resolution) process may include the use of one or more lookup operations or a machine-learned model. In a particular example, the determination process may include matching tagged features against the personal data using exact match, partial match, n-gram match, the number of matches, non-zero entity match (e.g., whether a non-zero entity is found in the personal data), etc. In such an example, any matched tagged features may be give more weight or a higher importance than unmatched tagged features.

In aspects, when the resolution is complete (e.g., zero or more tagged features have been matched against entries in the personal data), the provisional query may be finalized into a final query. In a particular example, the final query may include matched tagged features but may exclude unmatched tagged features. In another example, the final query may include both matched and unmatched tagged features, but the unmatched tagged features may be determined to be optional or less important to the final query. In some examples, NLU model(s) 244 may transmit the final query to query processing engine 242 for processing. In other examples, NLU model(s) 244 may transmit the final query to a query search component, such as a search engine. The NLU model(s) 244 may transmit the search result provided by the query search component to query processing engine 242 or to client device 210.

The NLU model(s) 244 may also be configured to be trained for particular domains and/or intents using one or more data sets. In aspects, the personal data received as input may also be used by NLU model(s) 244 to assign statistical weights and/or probabilities to one or more features in the personal data. The assigned values may be used in an algorithm to determine, for example, the likelihood that a particular tagged slot value (e.g., "John") corresponds to a particular entity type (e.g., contact name), or to determine the most relevant set of features. The algorithm may additionally or alternately use the information associated with the resolution process described above to make determinations. In other aspects, training data (instead of a "real" user's personal data) may be used to train NLU model(s) 244. For example, training profiles comprising randomly generated signals may be used as input to NLU model(s) 244. In such an example, the NLU model(s) 244 may be able to assign statistical weights and/or probabilities to one or more features in the training data as described above. However, because the NLU model(s) 244 may not have the benefit of the resolution process, the statistical weights and/or probabilities assigned, and the features used to make the assignments may vary from those of the personal data. In such aspects, NLU model(s) 244 may be trained based on a defined schedule or upon the determination of specific criteria (e.g., the NLU server 240 is not currently being queried by a client device, or is below a specified level of processing activity, etc.).

FIGS. 3-6 illustrates example methods of personalizing a natural language understanding system as described herein. In aspects, methods 300-600 may be executed by an exemplary system such as system 100 of FIG. 1. In examples, methods 300-600 may be executed on a device comprising at least one processor configured to store and execute operations, programs or instructions. However, methods 300-600 are not limited to such examples. In other examples, methods 300-600 may be performed on an application or service for providing query resolution. In at least one example, methods 300-600 may be executed (e.g., computer-implemented operations) by one or more components of a distributed network, for instance, a web service/distributed network service (e.g. cloud service) to leverage natural language personalization techniques for a language understanding system.

Exemplary method 300 begins at operation 302 where data may be uploaded to a personalization server. In aspects, the data may be uploaded from, for example, a client device or a data store accessible to a one or more client devices. The data may be uploaded to a personalization server in response to a manual instruction from a device within exemplary system 100. Alternately, the data may be automatically uploaded to a personalization server according to a defined upload schedule or upon the determination of specific criteria. In a particular example, the data may uploaded be to a personalization server three times a day, as long as the client device that is initiating the upload is not currently receiving a query via the natural language understanding interface. In another example, the data may uploaded be to a personalization server upon a manual instruction from the client device as long as there is sufficient connectivity between the uploading device and the personalization server. In some aspects, the uploaded data may comprise input signals, usage and/or behavioral information, etc. from one or more client devices. For example, a first client device having a first set of input signals (e.g., browsed websites and accessed documents) for a user and a second client device having a second set of input signals (e.g., contact lists and GPS signals) for the user may upload their respective input signals and/or user-identifying information to a personalization server. In aspects, the personalization server may organize and store the received input signals in a data store. For example, the personalization server may parse and group the input signals according to one or more of user, domain, application, creation/modification date, etc., and may store the grouped data by user ID (or a similar user identifier) in one or more tables of a database. In some examples, the personalization server may encrypt the input signals and/or the grouped data.

At operation 304, a data request may be received at a language understanding server. In aspects, the data request may be initiated by one or more of the client devices described in operation 302. For example, a client device may use a query UI or API (e.g., a personal digital assistant, a search engine, etc.) to submit the query "Get May, please" to the language understanding server. In such an example, the client device may transmit information identifying the user and/or the client device that originated the query as part of the data request. In some aspects, the language understanding server may process the received query by extracting semantic frames to represent the domain, intents and/or slots of the query. For example, using the above query, the language understanding server may determine that "May" may refer to the 'contact' domain (e.g., contact name "May Lee"), the 'calendar' domain (e.g., month of "May"), or the 'music' domain (e.g., music song "May Pleas"). Based on this determination, the language understanding server may provisionally assign (e.g., tag) the corresponding domain (e.g., domain=' contact' or domain='calendar', etc.) and further determine the intents and/or slots of the query. For example, if the language understanding server determines that "May" most likely refers to the 'contact' domain, "Get" may be provisionally assigned the intent "place call," and "May" may be provisionally assigned the slot "contact name." On the other hand, if the language understanding server determines that "May" most likely refers to the 'music domain, "Get" may be provisionally assigned the intent "play song," and "May Pleas" may be provisionally assigned the slot "song name."

In some aspects, a plurality of provisional values (e.g., rankings, scores, etc.) may be generated by the language understanding server for one or more of the extracted semantic frames using one or more language understanding hypotheses. A language understanding hypothesis, as used herein, may refer to a proposed solution for a natural language expression or an aspect thereof. For example, using the above query, a first language understanding rule set (or language understanding model) may be used to determine that "May" refers to the 'contact' domain; a second language understanding rule set may be used to determine that "May" refers to the 'music domain; and a third language understanding rule set may be used to determine that "May" refers to the 'calendar' domain. In a particular example, each of the determined domain values (e.g., contact, music and calendar) may be provisionally assigned a score (such as of 0.33) based on the number of domain values. In another example, the determined domain values may be provisionally assigned a score based on one or more rules in a corresponding language understanding rule set. In such examples, although the scores may be assigned for the various domain values, a particular domain value may not be assigned (provisionally or otherwise) to the domain. In other examples, the determined domain values (e.g., contact, music and calendar) may not be assigned scores. Instead, the determined domain values may be stored for further processing.

In some aspects, the language understanding server may use at least a portion of the data request to acquire a credential to facilitate accessing the personalization server for input signals associated with the user initiating the data request (e.g., personal data). For example, the language understanding server may use the user-identifying information to generate (or otherwise acquire) a user token representing the encrypted identity of the user. In some examples, the user token may also include at least a portion of the assigned values (e.g., tagged domains, intents and/or slots). In a particular example, the language understanding server may comprise or have access to a token issuing authority that generates and issues the user tokens to the language understanding server. The token issuing authority may be operable to expire the user token after a specified time period and/or to revoke the user token based on specified criteria.

At operation 306, the language understanding server may access the personalization server. In aspects, language understanding server may use the user token described in operation 304 to access personal data on the personalization server. For example, the personalization server may use the received user token to authenticate a user corresponding to the user token. If the user has been successfully authenticated, the personalization server may make at least a portion of the personal data for that user accessible to the language understanding server. In a particular example, making the personal data accessible may include searching the data store for one or more domains (e.g., 'contacts,' 'calendar' and/or 'music' domains) and/or strings (e.g., "May"), decrypting the personal data found in the searched data, and providing the (e.g., physical and/or logical) location of the decrypted data to the language understanding server. In another example, making the personal data accessible may additionally or alternately include extracting the searched personal data to a data structure (e.g., a hash, an array, etc.), decrypting the personal data in the data structure, and providing the data structure to the language understanding server. In such examples, searching the data store may include matching the user token (or the information represented by the user token) to identifying information (e.g., username, user ID, etc.) and associated personal data in the data store.

At operation 308, the language understanding server may process the personal data accessed on the personalization server. In aspects, the language understanding server may search the accessed personal data to resolve (e.g., verify) whether one or more tagged values exists within the accessed personal data. For example, when the language understanding server determines that "May" most likely refers to the 'contact' domain, the language understanding server may search the accessed personal data to determine whether the string "May" appears in data associated with one or more domains. In a particular example, the language understanding server may determine that only the 'contact' domain includes an entry or value corresponding to the string "May" (e.g., contact_name="May Lee"). As a result, the language understanding server may modify the provisional assignments (e.g., domain='contact,' intent="place call," slot="May Lee") to final assignments. In another example, the language understanding server may determine that only the 'music' domain includes an entry or value corresponding to the string "May" (e.g., song_name="May Pleas"). As a result, the language understanding server may modify the provisional assignments (e.g., domain='contact,' intent="place call," slot="May") such that the domain is assigned 'music,' the intent is assigned "play song," and the slot is assigned "May Pleas." The modified provisional assignments may be considered as final assignments. In yet another example, the language understanding server may determine that the 'contact,' 'calendar' and 'music' domains includes an entry or value corresponding to the string "May" (e.g., contact_name="May Lee," month="May," and song_name="May Pleas"). As a result, the language understanding server may not be able to make a definitive determination about the provisional assignments and further processing of the provisional assignments (using, for example, an LU model) may be required.

In other aspects, the language understanding server may search the accessed personal data to analyze and/or rank one or more potential values for a feature in the data request. For example, the language understanding server may determine that the domain of a data request may correspond to one of a plurality of values (e.g., contacts, movie, calendar). As a result, the language understanding server may use the personal data to resolve whether one or more of the plurality of values exists within the accessed personal data. The output of this resolution process may be provided to a ranking component to determine and/or rank one or more features of the data request. In examples, the ranking component may use signal data, user information and/or device information to determine rankings. In a particular example, the ranking component may use personal data to arbitrate between a plurality of values. The arbitration may include identifying entries in the personal data and applying one or more rule and/or rule sets to the identified entries. For example, the ranking component may use application data in the communication domains (e.g., email data, phone call data, messaging data, etc.) to determine that the contact "May Lee" has not been contacted in the last three months; application data in the notifications domains (e.g., calendar data, alerts data, notification data, etc.) to determine that the month is currently December and that there are currently no events scheduled for the month of May; and application data in the multimedia domains (e.g., video data, image data, music data, messaging data, etc.) to determine that the song "May Pleas" has been played 20 times in the last week using a music app on the client device and the corresponding music video has been played twice in the last two weeks using a video streaming app on the client device. Accordingly, the ranking component may rank 'music' as the mostly likely domain, 'contacts' as the second mostly likely domain, and 'calendar' as the least likely domain. In at least one example, the ranking component or another component of the language understanding server may then assign 'music' to the domain.

At operation 310, the language understanding server may generate a finalized query. In aspects, the language understanding server may provide the provisional assignments, the final assignments, and/or the data request information as input to one or more LU models accessible to the language understanding server. In examples, an LU model may use the input as features for domain classification, intent detection, and/or slot labeling. For example, if a set of final assignments targeting the 'contact' domain (e.g., domain='contact,' intent="place call," slot="May Lee") is input to an LU model, the LU model may use 'contact' as the feature for the domain, "place call" as a feature for the intent, and "May Lee" as the feature for the slot. In some aspects, as a result, the LU model may output a final query comprising the necessary features, formatting, and/or instructions to execute the final query. The final query may be executed by a client device, a component of the language understanding server or by a query processing component accessible to the language understanding server or client device. In one example, the final query may include the instructions (e.g., open music application, play song, etc.) and/or information (e.g., song_name="May Pleas") to enable a client device to play the requested song. In another example, the final query may include the information (e.g., telephone number=555-555-5555), elements of the data request (e.g., "Get May") and/or elements of the finalized query (e.g., Call May Lee). In other aspects, as a result, the LU models may use the assigned features to perform the determined intent. In a particular example, the input may include 'movies' as the feature for the domain, "find movies" as a feature for the intent, and "new releases" as the feature for the slot. The LU models may use the input to query a search engine or data repository for a result set comprising recently released movie titles, and may transmit the result set to the requesting client device. In another example, the input may include 'calendar' as the feature for the domain, "show events" as a feature for the intent, and "May" as the feature for the slot. The LU models may use the input to query a calendaring application or data repository for a result set comprising appointments and/or meetings for the month of May. The result set may be transmitted to the client device and displayed on a query UI or API as described in operation 304.

In optional operation 312, the LU models may be trained using input signals. In some aspects, the LU models may be trained using the provisional assignments, the final assignments, the ranking information, and/or the final query. For example, an LU model may use final assignments to identify and/or determine the input expected for particular queries, query types, domains, etc. In a particular example, an LU model may determine that the "place call" intent is associated with the 'contacts' domain in 95% of the queries received from a user. As a result, the LU model may assign a weight or score to the 'contacts' domain (for example, 0.95 out of 1.00) and a lower weight or score (for example, 0.05 out of 1.00) to all other domains, collectively. This assigned weight or score may indicate a higher probability that a tagged slot value corresponding to a query comprising the "place call" intent will be located in the 'contacts' domain of the user's personal data. Consequently, the LU may establish or modify a search strategy of the language understanding server to search the 'contacts' domain prior to other domains when such a query is received.

In another example, the LU model may receive input (e.g., "Call May") that exists in multiple entries of one or more domains (e.g., 'contacts' domain, contact names="May Lee," "May Winters," "Aunt May," and "May" (referring to "Michael May")). The LU model may use behavioral information, data from other domains, or the like to assign a probability score to each contact name. In a particular example, the LU model may search a recent call history, a recent messages folder, and a travel log. The search may reveal that over the past month a user has contacted May Winters 20 times (e.g., via phone, instant message, email, etc.), visited the residence of May Winters 3 times, contacted May Lee twice, and not contacted or visited Aunt May and Michael May. As a result, the LU model may assign a score to each of the contacts, such that the score for the May Winters contact is higher than that score the May Lee contact, which is higher than scores for the Aunt May and Michael May contacts. Consequently, when the LU receives a provisional assignment comprising a "place call" intent and the string "May," the LU may modify the provisional assignment according to the assigned scores (which may be stored by the LU model) or generate and provide a ranked list of possible assignments (e.g., contacts) to a client device.

In yet another example, the LU model may receive input corresponding to more than one domain and/or having more than one slots. In a particular example, the query "Call May tonight" may be processed by the language understanding server such that the domain is provisionally assigned 'contacts', the intent is provisionally assigned "place call", a first slot is provisionally assigned "May" and a second slot is provisionally assigned "tonight." The LU model may use, for example, usage and/or behavioral information, previous queries and/or result sets, etc. determine that one of the provisionally assigned slots is more relevant to the assigned intent than the other provisionally assigned slot. For instance, the LU model may determine that temporal slot features (e.g., tonight) more clearly indicate user intent than entity slot features (e.g., May). This determination may include identifying that a query requesting an action to be performed "tonight" (or at a later time) most likely corresponds to a "set reminder" or "set alarm" intent than to a "place call" intent. As a result, the LU model may assign a score to the associated domain, intent and/or slots indicating this likelihood. As an example, when a temporal slot feature is detected, the LU model may assign a score of 0.75 out of 1.00 (indicating a 75% probability) to the "set reminder" intent, a 0.50 out of 1.00 (indicating a 50% probability) to the "set alarm" intent, and a 0.05 out of 1.00 (indicating a 5% probability) to the "place call" intent. Consequently, the LU model may use the scores to determine the features to be used to output a final query or to produce a result set.

In other aspects, the LU models may be trained using training data. For example, an LU model may use training data to identify and/or determine the input expected for particular queries, query types, domains, etc. The training data may include randomly generated personal information and may be used to train an LU model without using a user's personal data. In an example, an LU model may receive as input a final query comprising training where the domain is assigned 'contact,' the intent is assigned "place call," and the slot is assigned "Tom." Although, the string "Tom" may not exist in the user's contact list, the LU model may determine that "Tom" exists in the 'contacts' domain of the training data. As a result, the LU model may correlate the "place call" intent with the 'contacts' domain, such that there is a high probability (e.g., 90% likelihood) that the tagged slot for a query comprising the "place call" intent is a contact in the user's contact list. Further, the LU model may assign a score to the domain and/or slot according to probability. Consequently, the LU may establish or modify a search strategy of the language understanding server to search the 'contacts' domain prior to other domains when such a query is received.

In aspects, the assigned weights and/or scores described above may be used to determine probable correlations between one or more of domains, intents and slot values. In examples, this determination may include the use of one or more algorithms. For example, the scores may be input to an algorithm accessible to the language understanding server. The algorithm may be used to determine the most relevant final query, the most probable value associated with a particular domain, intent and/or slot values, or the like. In a particular example, the algorithm may be used to determine the most probable values of one or more input features by selecting the values from domain, intent and/or slot with the highest scores. In another example, the algorithm may assign weighted values to one or more features to determine a most probable result. As an example, for the query "Call May tonight," the "calendar" domain may be assigned a probability score of 0.75 out of 1.00, the "music" domain may be assigned a probability score of 0.15 out of 1.00, the "set reminder" intent may be assigned a probability score of 0.75 out of 1.00, the "place call" intent may be assigned a probability score of 0.25 out of 1.00, the "play song" intent may be assigned a probability score of 0.10 out of 1.00, the "May Lee" slot may be assigned a probability score of 0.40, and the "Aunt May" slot may be assigned a probability score of 0.10. The algorithm may assign a weight of 3.0 out of 3.0 to the combination of the "calendar" domain (0.75), the "set reminder" intent (0.75), and the "May Lee" slot (0.40) based on the highest aggregate score (1.90), such that the weighted score is 5.70 (e.g., 3.0*1.90). The algorithm may assign a weight of 2.5 out of 3.0 to the combination of the "calendar" domain (0.75), the "set reminder" intent (0.75), and the "Aunt May" slot (0.10) based on the aggregate score (1.60), such that the weighted score is 4.0 (e.g., 1.6*2.5). The algorithm may further assign a weight of 1.0 out of 3.0 to the combination of the "music" domain (0.15), the "play song"

intent (0.10), and the "Aunt May" slot (0.10) based on the aggregate score (0.45), such that the weighted score is 0.45 (e.g., 0.45*1.0). Based on these weighted scores (e.g., 5.70, 4.0 and 0.45), the algorithm may calculate and/or determine that the probable values of features for a particular query (e.g., "Call May tonight") are "calendar" for the domain, "set reminder" for the intent, and "May Lee" for the slot.

Figure 4:
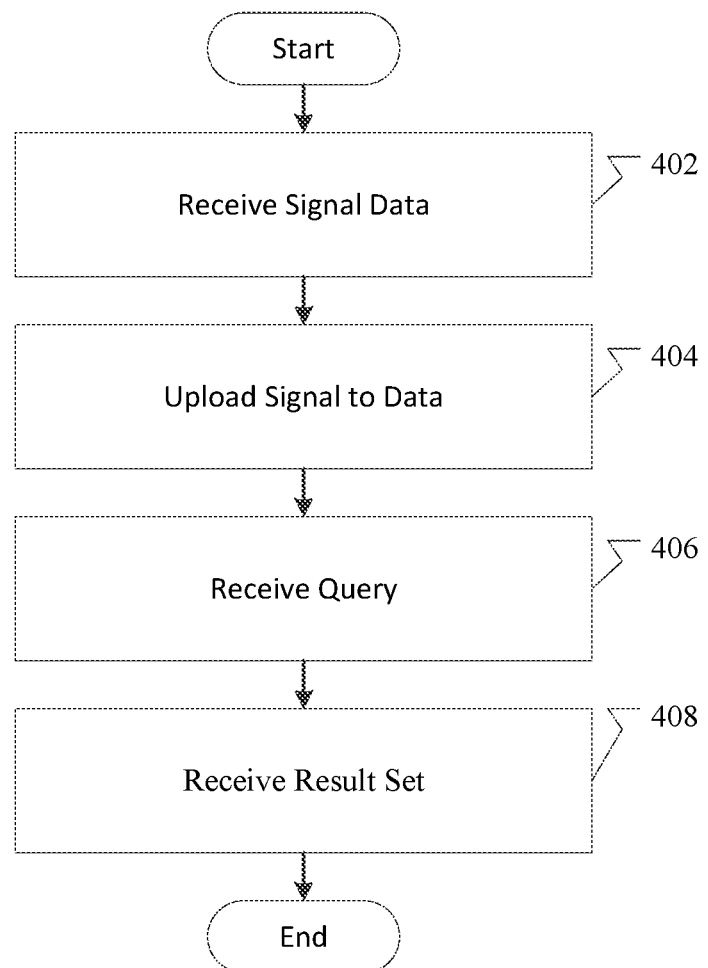
FIG. 4 illustrates an example method of personalizing a natural language understanding system from the perspective of a client device as described herein.

FIG. 4 illustrates an example method of personalizing a natural language understanding system from the perspective of a client device as described herein. Exemplary method 400 begins at operation 402 where user signal data and associated information may be received via a user interface, such as user interface 212, of a client device. In aspects, the client device may process and store the signal data in a data store accessible to the client device. Processing the signal data may include parsing the signal data and/or grouping the signal data by user identification, application, domain, time period, etc. For example, the user of a client device may access a word processing application and a social media application from a user interface of the client device. The client device may store new and/or modified documents in a data store configured to store word processing application and may store contact information, event data, and/or behavioral data in a data store configured to be store data from various application.

At operation 404, the signal data may be uploaded to a personalization server. In aspects, the client device may use a upload component, such as data upload engine 214, to upload the signal data to a personalization server. In some examples, the upload component may access one or more data stores accessible to one or more client devices to retrieve signal data for a user. The upload component may retrieve all of the data for a particular user or only the data that has been modified in a specified period (e.g., since the last signal data upload). In other examples, the upload component may access and/or receive signal data on one or more client devices for a plurality of users. The upload component may additionally access information on the client device that identifies the user(s) and/or the client device(s). In a particular example, the upload component may pair or otherwise associate the retrieved signal data with the identifying information, and may transmit the paired data to the personalization server. In some aspects, the upload component may perform the upload periodically, according to a defined schedule, or upon receiving a manual instruction.

At operation 406, a query may be received by the client device. In aspects, a user may submit a query to an application executing on the client device (e.g., a personal digital assistant, a web browser, etc.) via a query UI or API, such as query API 216. The query API may parse the received query to identify a category, subject, and/or domain of the query. The query API may use an identification of the user (e.g., a user ID, username, etc.) to associate the query and/or the identified parts of the query with the identification. The query API may then transmit the received query and associated information to a language understanding server for processing and resolution.

At operation 408, a result set may be received by the client device. In aspects, the query API may receive query results from the language understanding server or from a service or device accessible to the language understanding server. In some examples, the query results may include a data set that corresponds to data that resolves the query. For instance, the query result may include several move times and theatre locations. In other examples, the query results may include instructions that allow the client device to satisfy the query. For example, the query results may include the necessary features, formatting, and/or instructions for the client device to execute a query. In some aspects, the query API presents the query results or the data that is generated using the query results to the user.

Figure 5:
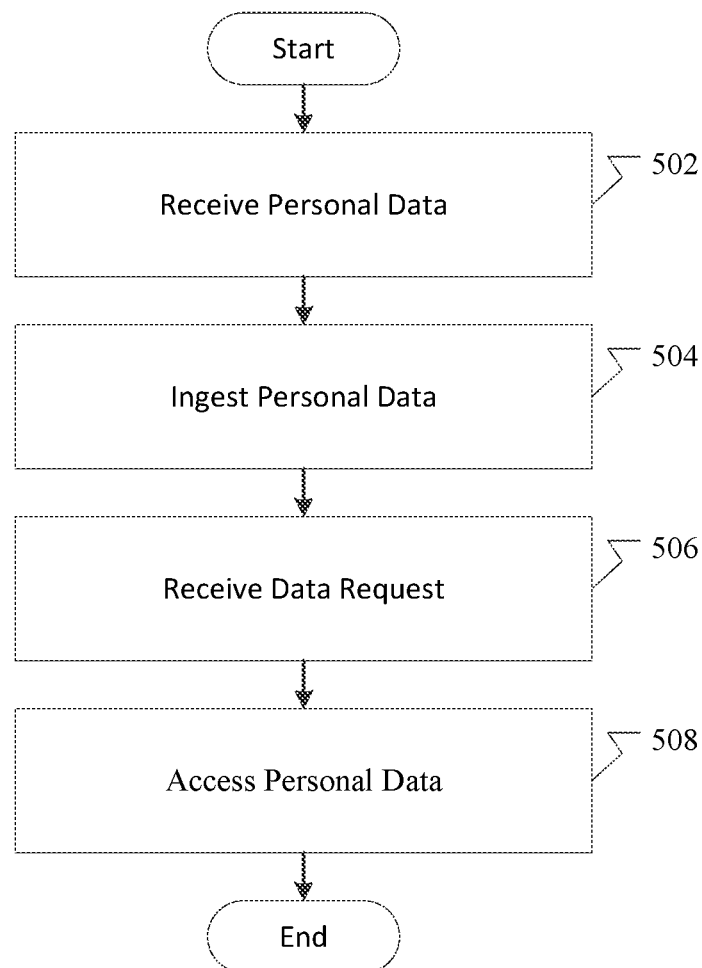
FIG. 5 illustrates an example method of personalizing a natural language understanding system from the perspective of a personalization device as described herein.

FIG. 5 illustrates an example method of personalizing a natural language understanding system from the perspective of a personalization device as described herein. Exemplary method 500 begins at operation 502 where personal data is received by the personalization server. In aspects, the personal data may be received from one or more client devices and/or data stores accessible to the client devices. The personal data may include signal data and/or identifying information for one or more users. In some examples, a data ingest component, such as ingest engine 222, may receive the personal data.

At operation 504, the personal data may be processed. In some aspects, a data ingest component may process the received personal data. Processing the personal data may include parsing the personal data by user, query subject, query domain, and the like. In examples, the data ingest component may store the parsed data into a data store, such as data store 224. The parsed data may be grouped and stored according to one or more of the categories identified during parsing (e.g., user, query subject, query domain, etc.). For example, personal data comprising data from a word processing application and a social media application may be inserted into a database accessible to the personalization server. The database may include one or more tables for the word processing application data and one or more tables for the social media application data. The data in each table may be associated using, for example, a primary key associated with a particular user, date, or some combination thereof. In some aspects, the personal data may be encrypted when the personal data is received by the data ingest component, such that the personal data is encrypted before being stored in the data store. In other aspects, the personal data may be encrypted by an encryption component associated with the data store after being stored the data store.

At operation 506, the personalization server may receive a data request for personal data. In aspects, the personalization server may receive a data request for personal data from, for example, a client device or a language understanding server. The data request may include a query, one or more tagged terms, and/or identifying information for a user and/or a client device. In some examples, a request processing component, such as request processing engine 226, may parse the data request to identify the included data. For example, the request processing component may identify a user token within the data request. In some aspects, the personalization server may use the user token to attempt to authenticate the user that generated the data request. In such example, if the user token cannot be authenticated, the requesting device (e.g., client device or language understanding server) is denied access to the personal data. If the user token can be authenticated, the requesting device may be provided to the personal data.

At operation 508, the personal data may be accessed. In aspects, the parsed data request data may be used to search one or more data stores comprising personal data for a user. For example, the request processing component may use the identifying information (e.g., user ID) and/or an identified query domain (e.g., contacts) to identify the tables that correspond to at least a portion of the a user's personal data. In aspects, the personal data identified in the data store may be made accessible to the requesting device. In a particular example, the request processing component may decrypt (or cause to be decrypted) the personal data as part of making the personal data accessible to the requesting device. In some aspects, the identified data may be temporarily marked as readable to the user making the request, such that the requesting device may freely submit queries concerning the user's personal data. In other aspects, the personal data identified in the data store may be used to populate a data structure (e.g., an array, a hash, etc.) that may be transmitted to the requesting device. In such an aspect, the personalization server's data store may not be configured to be directly queried by the requesting device. In yet other aspects, the personalization server may transmit to the requesting device an acknowledgment that the searched data has been identified in the data store.

Figure 6:
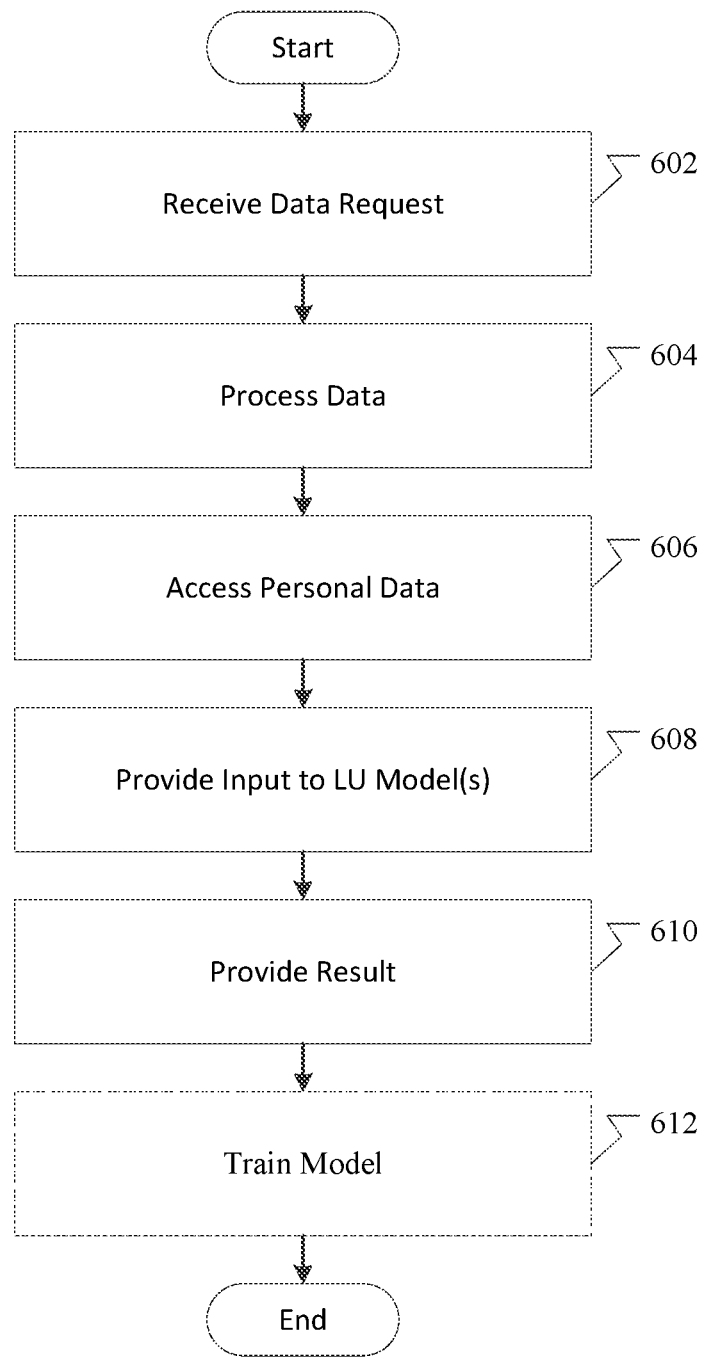
FIG. 6 illustrates an example method of personalizing a natural language understanding system from the perspective of a language understanding device as described herein.

FIG. 6 illustrates an example method of personalizing a natural language understanding system from the perspective of a language understanding device as described herein. Exemplary method 600 begins at operation 602 where a data request is received by a language understanding device. In aspects, the data request may be received by a query processing component, such as query processing engine 242. The query processing component may be accessible to one or more client devices and/or a personalization server. In some examples, the data request may include a query and/or identifying information for a user and/or one or more client devices.

At operation 604, the language understanding device may process the data request. In aspects, the language understanding device may use a component, such as query processing component, to parse the data request into user- and/or client-identifying information and values for one or more domains, intents and/or slots. In some examples, the parsed data may be used to determine probable associations between the values and the corresponding domains, intents and/or slots. For example, the parsed data may be used as input to, or in conjunction with, an algorithm for assigning statistical weights and/or probabilities to one or more features in the personal data. In some aspects, the probable values may then be provisionally (e.g., temporarily) assigned (e.g., tagged) to the corresponding features. A portion of the identifying information and the provisionally-assigned values may then be transmitted to a personalization server.

At operation 606, the language understanding device may access the personal data. In aspects, the query processing component may use the accessed personal data to determine the accuracy of the provisionally values assigned at operation 604. For example, the language understanding device may determine whether one or more provisionally-assigned values exists in the accessed personal data. If the value is determined to exist, the language understanding device may convert the provisional value into a final or non-provisional value, thereby verifying the accuracy of the assignment. If the value is determined not to exist, the language understanding device may perform additional processing on the provisional value. For example, the language understanding device may use the data request data and/or the algorithm described at operation 604 to reassign one or more of the provisional values to one or more corresponding features in the personal data.

At operation 608, the assigned values may be provided to a language understanding (LU) model. In aspects, an LU model, such as NLU model(s) 244, may use the assigned values as input features for domain classification, intent detection, and/or slot labeling. In some examples, the LU model may use the input to query a search engine or data repository for a result set to satisfy the search query. For example, the LU model may use the input to query a search engine, content provider, or the like. In other examples, the LU model may use the input to generate a finalized query comprising the necessary features, formatting, and/or instructions to execute the finalized query. In such an example, the finalized query may be customized to be executed on the requesting device.

At operation 610, the language understanding device may provide output to the requesting device. In aspects, the LU model may provide a result set, a finalized query or the like to a component of the language understanding device, such as query processing engine 242. The output may be transmitted to the client device and received by a component that is capable of executing the final query and/or presenting the result set to the user.

At optional operation 612, the LU model may be trained. In aspects, the LU model may be trained by a training component, such as training engine 246, using the provisional assignments, the final assignments, and/or the finalized query. In some examples, an LU model may use final assignments to identify and/or determine the input expected for particular queries, query types, domains, etc. and/or to determine the probable accuracy of the one or more assigned values. In other examples, an LU model may be trained using training data. The training data may comprise randomly generated personal information and may not include signal data from the requesting user. In some aspects, the LU model may be trained according to a manual instruction, periodically or according to a defined schedule. For example, the LU model may be trained at any time that the language understanding device is not actively processing a user request received. As another example, the LU model may be trained when the language understanding device is in low use or maintenance mode.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
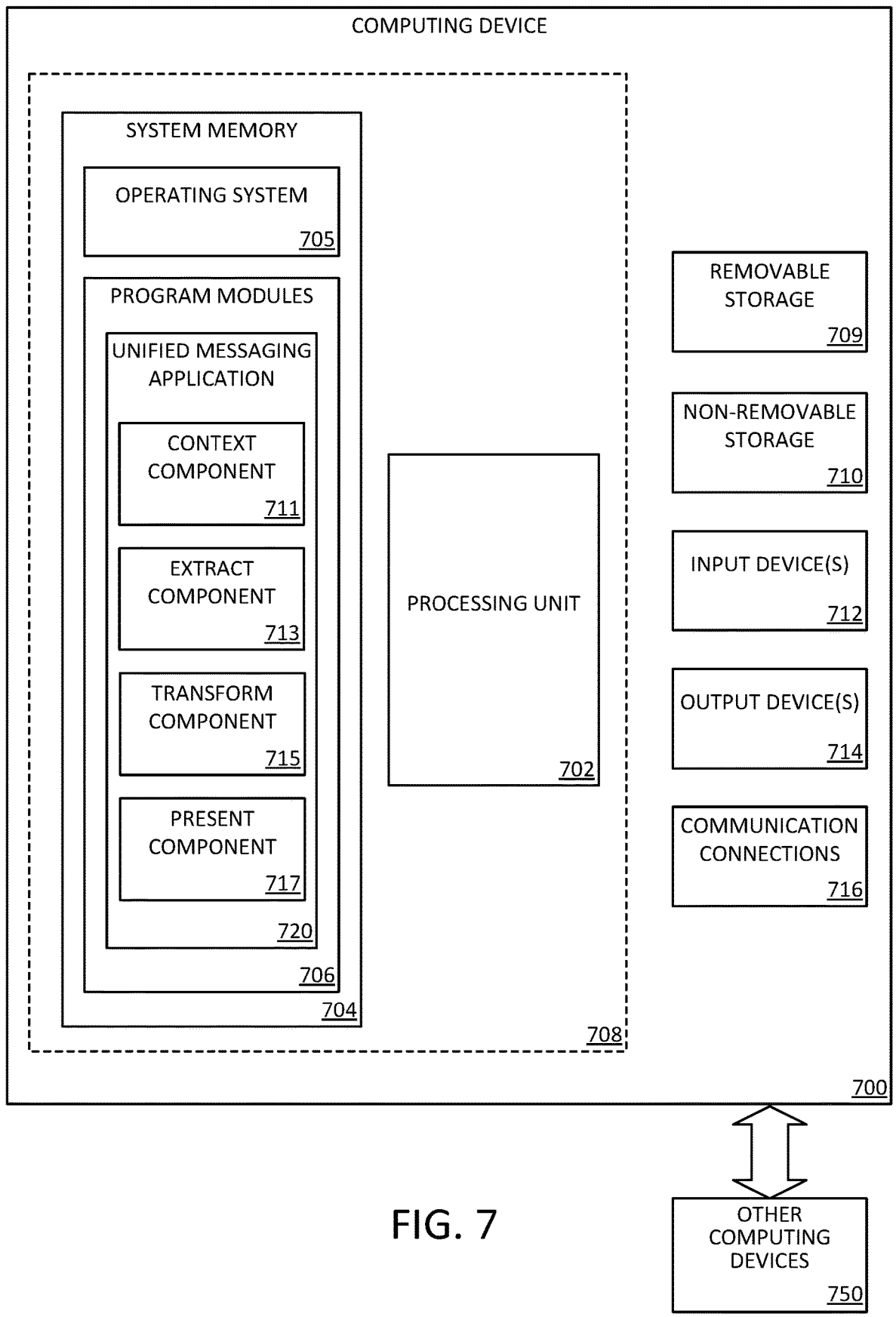
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for implementing a unified messaging application on a server computing device 106 (or server computing device 308), including computer executable instructions for unified messaging application 720 that can be executed to employ the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running unified messaging application 720, such as one or more components in regards to FIG. 3 and, in particular, context component 711, extract component 713, transform component 715, or present component 717. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., unified messaging application 720) may perform processes including, but not limited to, the aspects, as described herein. Other program modules that may be used in accordance with aspects of the present disclosure, and in particular for providing a unified messaging platform, may include context component 711, extract component 713, transform component 715, or present component 717, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
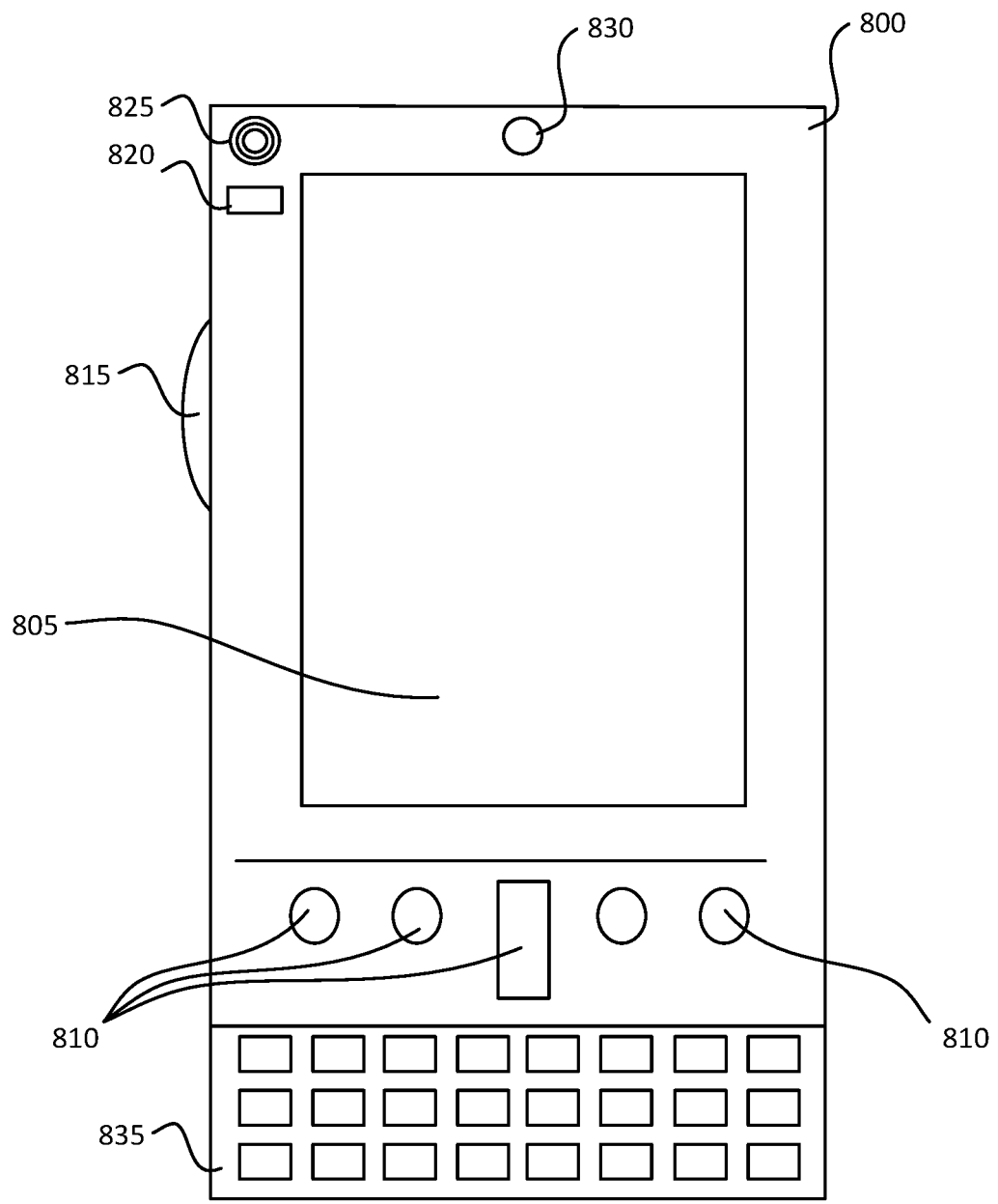
FIGS. 8A and 8B are simplified block diagrams of a mobile computing device with which aspects of the present disclosure may be practiced.
Figure 8B:
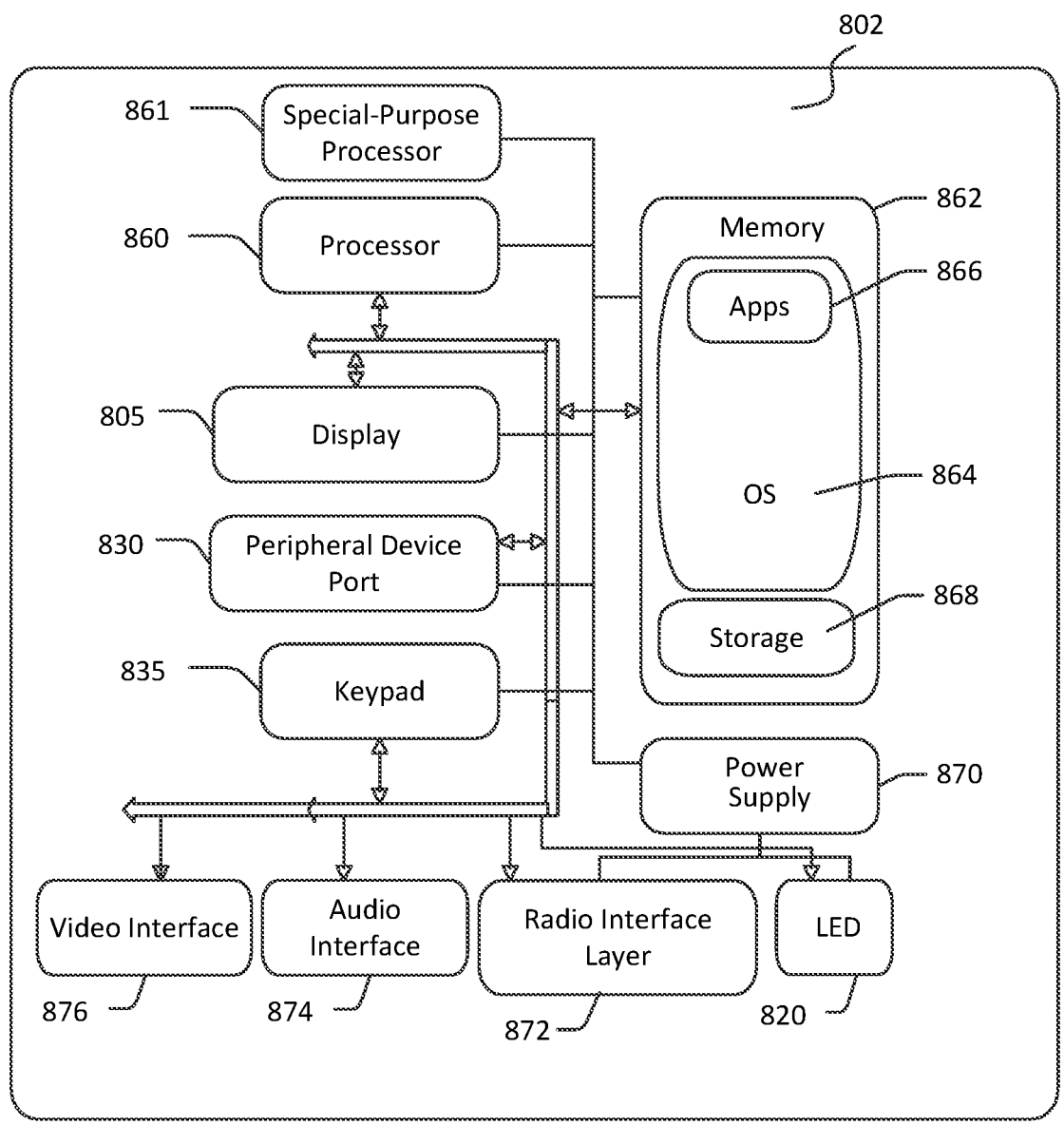

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for providing a unified messaging platform as described herein (e.g., search engine, extractor module, relevancy ranking module, answer scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
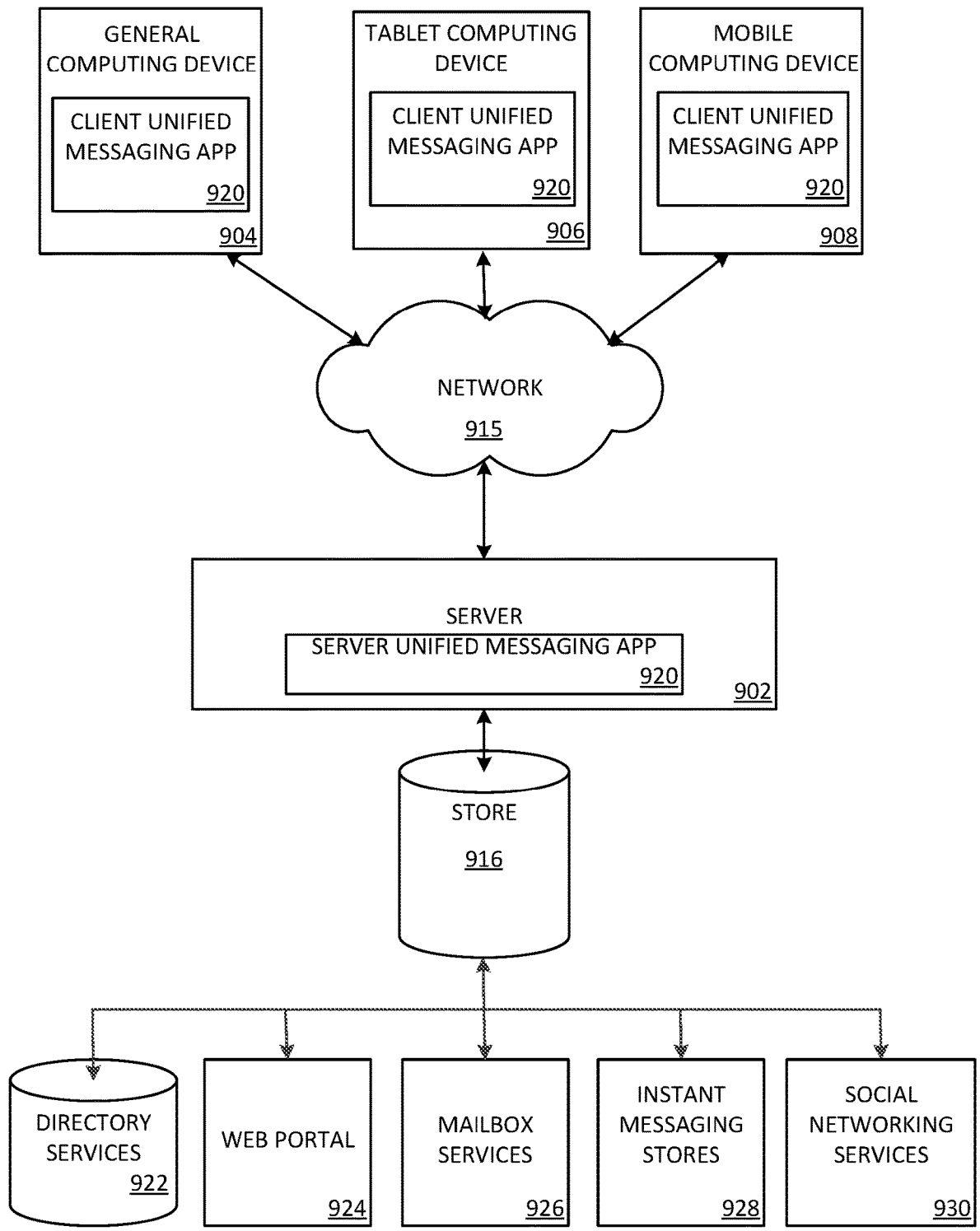
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The unified messaging application 920 may be employed by a client that communicates with server device 902, and/or the unified messaging application 920 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above with respect to FIGS. 1-6 may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
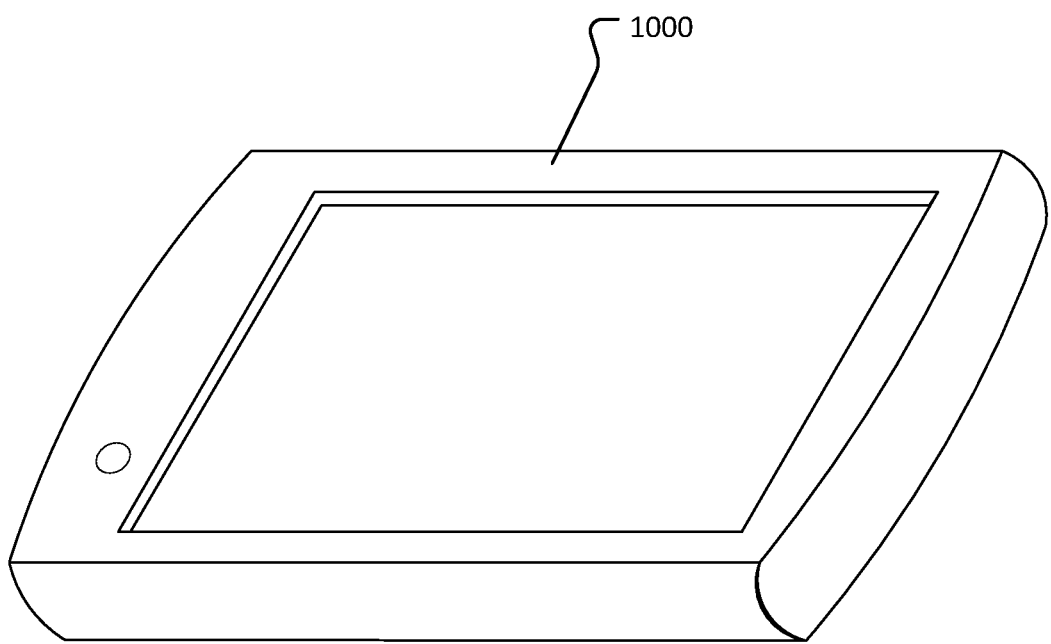
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, cause the at least one processor to execute a process comprising:
     receiving, at one or more devices, a request comprising at least an initial query and a user identifier (ID);
     parsing the initial query to identify a plurality of values associated with at least one of a domain, an intent, or a slot;
     assigning, by the one or more devices, a first provisional domain to the initial query based on a first value of the plurality of values and a second provisional domain to the initial query based on a second value of the plurality of values;
     accessing a personalization server storing personal data of the user based on the user ID, wherein the personal data comprises information associated with the user including at least one of user profile data or user signal data;
     resolving one or more slots for the plurality of values using the personal data:
       ranking the plurality of values, wherein the ranking comprises using the resolved one or more slots to determine a most likely value;
       based on the ranked plurality of values, assigning a first score to the first provisional domain and a second score to the second provisional domain, wherein the first score is higher than the second score;
     selecting the first provisional domain as a final domain based on the first score being higher than the second score;
     generating a final query from the initial query based on the final domain;
     providing the final query to a language understanding model to generate a response; and
     providing the response to the user.

2. The system of claim 1, further comprising: uploading, from a client device, the personal data to the personalization server, wherein the personal data includes at least one of: personal contacts, user files and documents, user locations, user applications, user social media information, user interests, user calendar information, user event data and user or client-identifying information.

3. The system of claim 1, further comprising
   provisionally assigning one or more of the plurality of values to a respective domain, intent, or slot.

4. The system of claim 3, wherein accessing the personal data includes:
   searching the personal data for matches to one or more of the provisionally assigned values;
   identifying one or more matches; and
   making the data associated with the one or more matches accessible to the language understanding model.

5. The system of claim 4, further including, for each provisionally assigned value matched to the personal data on the personalization server, converting the provisionally assigned values to final values.

6. The system of claim 1, wherein the login information is used to generate a token, the token representing an encrypted identity of the user, and wherein the token is transmitted to the personalization server.

7. The system of claim 6, wherein accessing the personalization server comprises using the token to authenticate the user on the personalization server.

8. The system of claim 1, wherein using the personal data includes using the language understanding model to determine and assign one or more features of the personal data, the one or more features corresponding to at least one of a domain, an intent or a slot.

9. The system of claim 8, wherein determining one or more features of the personal data includes using at least one of an exact match, a partial match, an n-gram match, a number of matches, or a non-zero entity match.

10. The system of claim 1, wherein generating the response to the final query includes retrieving a result set from a search engine, the result set comprising data satisfying the final query.

11. The system of claim 1, wherein the response comprises a set of instructions operable to enable the client device to satisfy the request.

12. The system of claim 1, further comprising:
    training the language understanding model using the personal data.

13. The system of claim 12, wherein the training includes generating, by the language understanding model, one or more scores corresponding to a probability that one or more values in the personal data corresponds to at least one of a domain, an intent or a slot for the query.

14. The system of claim 1, further comprising:
    training the language understanding model using training data, the training data comprising fake user information;
    wherein the language understanding model is trained when the request from the user is not being processed.

15. A method for performing personalized natural language understanding, the method comprising:
- receiving, at a one or more devices, a request comprising at least an initial query and identification information for a user;
- parsing the initial query to identify a plurality of values associated with at least one of a domain, an intent, or a slot;
- assigning, by the one or more devices, a first provisional domain to the initial query based on a first value of the plurality of values and a second provisional domain to the initial query based on a second value of the plurality of values;
- accessing a personalization server storing personal data of the user based on the identification information, wherein the personal data comprise information relating to the user including at least one of user profile data or user signal data;
- resolving one or more slots for the plurality of values using the personal data;
- ranking the plurality of values, wherein the ranking comprises using the resolved one or more slots to determine a most likely value;
- based on the ranked plurality of values, assigning a first score to the first provisional domain and a second score to the second provisional domain, wherein the first score is higher than the second score;
- selecting the first provisional domain as a final domain based on the first score being higher than the second score;
- generating a final query based on the final domain;
- using, by a language understanding model, the final query to generate a response; and
- providing the response to the user.

16. The method of claim 15, further comprising:
- provisionally assigning one or more of the plurality of values to a respective domain, intent or slot.

17. The method of claim 16, wherein accessing the personal data includes:
- searching the personal data for matches to one or more of the provisionally assigned values;
- identifying one or more matches; and
- making the data associated with the one or more matches accessible to the personalization server.

18. The method of claim 15, wherein using the personal data includes using the language understanding model to determine and assign one or more features of the personal data, the one or more features corresponding to at least one of a domain, an intent or a slot.

19. A computer-readable storage medium having computer-executable instructions stored thereon, the computer-executable instructions when executed by a processor causing a computer system to:
- receive a request comprising at least an initial query and a user identifier (ID);
- parse the initial query to identify a plurality of values associated with at least one of a domain, an intent, or a slot;
- assign a first provisional domain to the initial query based on a first value of the plurality of values and a second provisional domain to the initial query based on a second value of the plurality of values;
- access a personalization server storing personal data of the user based on the user ID, wherein the personal data comprises information associated with the user including at least one of user profile data or user signal data;
- resolve one or more slots for the plurality of values using the personal data;
- rank the plurality of values, wherein the ranking comprises using the resolved one or more slots to determine a most likely value;
- based on the ranked plurality of values, assign a first score to the first provisional domain and a second score to the second provisional domain, wherein the first score is higher than the second score;
- select the first the provisional domain as a final domain based on the first score being higher than the second score;
- generate a final query from the initial query based on the final domain;
- provide the final query to a language understanding model to generate a response; and
- provide the response to the user.

* * * * *